United States Patent
Wakuda et al.

(10) Patent No.: US 11,086,350 B2
(45) Date of Patent: Aug. 10, 2021

(54) INPUT APPARATUS, METHOD FOR CONTROLLING INPUT APPARATUS, AND CONTROL PROGRAM

(71) Applicant: Alps Alpine Co., Ltd., Tokyo (JP)

(72) Inventors: Hiroshi Wakuda, Miyagi-ken (JP); Takeshi Shirasaka, Miyagi-ken (JP); Takuya Abe, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/719,526

(22) Filed: Dec. 18, 2019

(65) Prior Publication Data

US 2020/0125132 A1    Apr. 23, 2020

Related U.S. Application Data

(63) Continuation of application No. PCT/JP2018/026585, filed on Jul. 13, 2018.

(30) Foreign Application Priority Data

Jul. 21, 2017  (JP) ............................ JP2017-141688

(51) Int. Cl.
  *G06F 3/0338*  (2013.01)
  *G05G 5/02*  (2006.01)
  *G05G 9/047*  (2006.01)
  *B60H 1/00*  (2006.01)

(52) U.S. Cl.
  CPC ............. *G05G 5/02* (2013.01); *G05G 9/047* (2013.01); *G06F 3/0338* (2013.01); *B60H 1/0065* (2013.01); *G05G 2009/0474* (2013.01); *G05G 2009/04766* (2013.01); *G05G 2505/00* (2013.01)

(58) Field of Classification Search
  CPC .............................. G06F 3/033; G06F 3/0338
  See application file for complete search history.

(56) References Cited

U.S. PATENT DOCUMENTS

2005/0159850 A1* 7/2005 Melman ................. G06F 3/033
                                                          701/1
2010/0073291 A1* 3/2010 Hisatsugu ............. G06F 3/0338
                                                          345/161

FOREIGN PATENT DOCUMENTS

| JP | 2004-021789 A | 1/2004 |
| JP | 2005-063228 A | 3/2005 |
| JP | 2009-053874 A | 3/2009 |

* cited by examiner

*Primary Examiner* — Gustavo Polo
(74) *Attorney, Agent, or Firm* — Crowell & Moring

(57) ABSTRACT

An input apparatus includes an operation member supported movably in accordance with a plurality of sections set on a two-dimensional plane, a section detection section configured to detect a section in which the operation member is located, a determination operation detection section configured to detect a determination operation performed using the operation member, and an execution section configured to perform a process corresponding to the section in which the operation member is located on the basis of the section detected by the section detection section and the determination operation detected by the determination operation detection section. The determination operation is movement of the operation member in a determination direction (y1 direction), which is a direction parallel to the two-dimensional plane.

9 Claims, 10 Drawing Sheets

INPUT APPARATUS, METHOD FOR CONTROLLING INPUT APPARATUS, AND CONTROL PROGRAM

CLAIM OF PRIORITY

This application is a Continuation of International Application No. PCT/JP2018/026585 filed on Jul. 13, 2018, which claims benefit of priority to Japanese Patent Application No. 2017-141688 filed on Jul. 21, 2017. The entire contents of each application noted above are hereby incorporated by reference.

BACKGROUND

1. Field of the Disclosure

The present disclosure relates to an input apparatus, a method for controlling the input apparatus, and a control program.

2. Description of the Related Art

Presently, input apparatuses exist that are mounted on a vehicle or the like and receive an input when an operator moves an operation member. Japanese Unexamined Patent Application Publication No. 2009-53874 discloses an input apparatus that includes an operation member of a joystick type and that receives an input when an operator moves the operation member in two dimensions. With the input apparatus disclosed in Japanese Unexamined Patent Application Publication No. 2009-53874, when the operator moves the operation member to any of a plurality of areas, a function corresponding to an area in which the operation member is located is performed.

However, if an operator unintendedly touches the operation member an unintended operation may be performed. This unintended function may occur immediately after an operation member is moved. Execution of a function based on a combination of two different operations, namely an operation for selecting a function by moving the operation member and an operation for determining the selection, therefore, has been explored. In an example, the determination operation can be achieved through an operation different from movement of the operation member, such as pressing of a switch.

When an operation different from the movement of the operation member is added, however, the operation that the operator is required to perform may be cumbersome.

SUMMARY

The present invention provides an input apparatus, a method for controlling the input apparatus, and a control program capable of preventing an unintended operation.

An input apparatus including an operation member supported movably in accordance with a plurality of sections set on a two-dimensional plane, a section detection section configured to detect a section in which the operation member is located, a determination operation detection section configured to detect a determination operation performed using the operation member, and an execution section configured to perform a process corresponding to the section in which the operation member is located based on the section detected by the section detection section and the determination operation detected by the determination operation detection section. The determination operation determines movement of the operation member in a determination direction, which is a direction parallel to the two-dimensional plane.

With this configuration, if a determination operation is performed separately from movement of the operation member to a section, a process corresponding to the section in which the operation member is located is performed. Compared to when the determination operation is not necessary, therefore, an unintended process tends to be prevented. Since the determination operation is performed through an operation along the two-dimensional plane, the structure and operation are simpler than a configuration where a switch is separately provided for the determination operation. In addition, the structure and operation are simpler than when an operation other than movement along the two-dimensional plane is necessary.

A method is also disclosed for controlling an input apparatus performed by the input apparatus, which includes an operation member supported movably in accordance with a plurality of sections set on a two-dimensional plane. The method includes detecting a section in which the operation member is located, detecting a determination operation performed using the operation member, and performing a process corresponding to the section in which the operation member is located based on the detected section and the detected determination operation. The determination operation determines movement of the operation member in a determination direction, which is a direction parallel to the two-dimensional plane.

The present disclosure also provides a control program causing a computer to perform the method for controlling an input apparatus.

DESCRIPTION OF THE EXEMPLARY EMBODIMENTS

Overall Configuration

Figure 1:
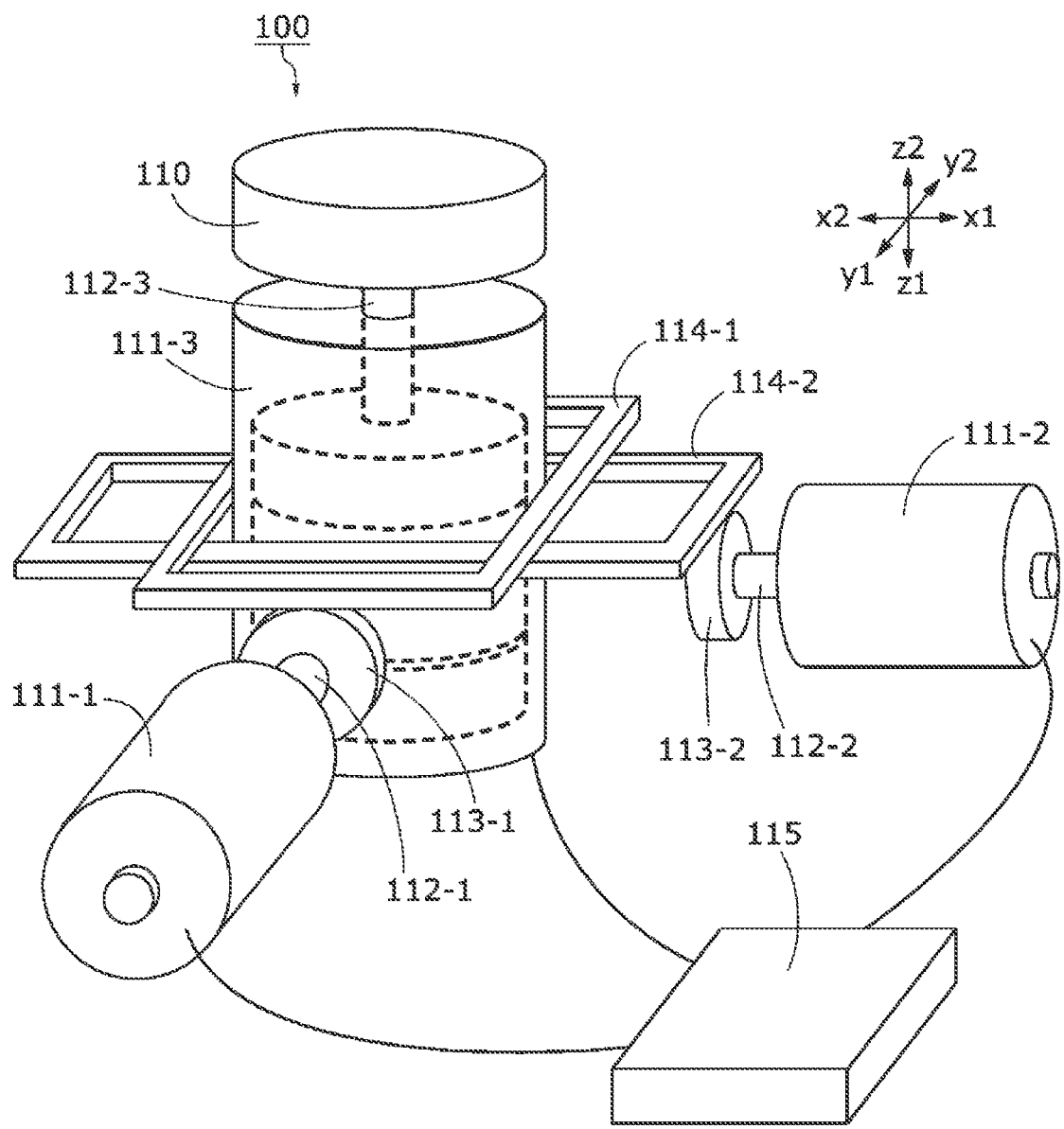
FIG. 1 is a schematic perspective view of an input apparatus according to a present embodiment.

An input apparatus according to an embodiment of the present invention will be described hereinafter. FIG. 1 is a schematic perspective view of an input apparatus 100 according to the present embodiment. In an example, the input apparatus 100 is located near a driver's seat of a vehicle, which is not illustrated. The input apparatus 100 is operated, for example, by a hand of an operator such as a driver. The operator holds an operation member 110, which will be described later, by hand, moves the operation member 110 on a two-dimensional plane, and requests a process by performing a determination operation, which will be described later. The process is, for example, selection of air conditioning inside the vehicle, a change to a set temperature of the air conditioning, or playback of music, but is not limited to these.

Herein x, y, and z directions are perpendicular to one another are described as follows. The x direction generically indicates an x1 direction and an x2 direction, which are opposite each other. The y direction generically indicates a y1 direction and a y2 direction, which are opposite each other. The z direction generically indicates a z1 direction and a z2 direction, which are opposite each other. These directions are defined for the sake of convenience in order to explain relative positional relationships, and do not limit directions in actual use. Shapes of components are not limited to strict geometrical shapes based on expressions used regardless of whether a word "substantially" is used, insofar as a technical idea of the embodiment disclosed herein is achieved.

As illustrated in FIG. 1, the input apparatus 100 includes the operation member 110 supported movably in accordance with a plurality of sections 190 (FIG. 5) set on the two-dimensional plane, a first driving device 111-1, a second driving device 111-2, a third driving device 111-3 (hereinafter might be generically referred to as "driving devices 111"), a first driving shaft 112-1, a second driving shaft 112-2, a third driving shaft 112-3 (hereinafter might be generically referred to as "driving shafts 112"), a first gear 113-1, a second gear 113-2 (hereinafter might be generically referred to as "gears 113"), a first relay member 114-1, a second relay member 114-2 (hereinafter might be generically referred to as "relay members 114"), and a control device 115.

The operation member 110 is a round column having a central axis extending in the z direction and is a flat disk extending on an x-y plane. The operation member 110 is not limited to the shape illustrated in FIG. 1 but may be, for example, spherical.

The third driving shaft 112-3 is a substantially round columnar member extending in the z direction and rotates about a central axis extending in the z direction. An end of the third driving shaft 112-3 on a z2 side is fixed to a z1 side of the operation member 110. The operation member 110 and the third driving shaft 112-3 are fixed to each other and move as one united body. The third driving device 111-3 rotates the third driving shaft 112-3 and detects the rotation of the third driving shaft 112-3. The third driving device 111-3 is supported by a chassis, which is not illustrated, in such a way as to be able to move in the x and y directions and not move in the z direction. The operation member 110, the third driving device 111-3, and the third driving shaft 112-3 move in the x and y directions as one united body. In another example, the third driving device 111-3 may be supported in such a way as to be move in the z direction, and the input apparatus 100 may include a detection device that detects the movement of the third driving device 111-3 in the z direction.

The first relay member 114-1 is a substantially rectangular frame-like member that includes two straight line units extending in the x direction and two straight line units extending in the y direction and that extends on the x-y plane. The third driving device 111-3 is provided inside the first relay member 114-1. The first relay member 114-1 is supported by the chassis, which is not illustrated, in such a way as to be able to move in the x direction and not move in the z and y directions.

The internal width of the first relay member 114-1 in the x direction is substantially the same as the width of the third driving device 111-3 in the x direction, and the third driving device 111-3 and the first relay member 114-1 move in the x direction as one united body. The internal width of the first relay member 114-1 in the y direction is greater than the width of the third driving device 111-3 in the y direction, and movement of the third driving device 111-3 in the y direction is not transmitted to the first relay member 114-1.

The first driving shaft 112-1 is a substantially round columnar member extending in the y direction and rotates about a central axis extending in the y direction. The first driving device 111-1 rotates the first driving shaft 112-1 and detects the rotation of the first driving shaft 112-1. A y2 end of the first driving shaft 112-1 is fixed to a y1 end of the first gear 113-1. The first gear 113-1 and the first driving shaft 112-1 rotate about a central axis extending in the y direction as one united body. A gear groove formed in a part of the first relay member 114-1 on the z2 side engages with the first gear 113-1. When the first relay member 114-1 moves in the x direction, the first gear 113-1 rotates. When the first gear 113-1 rotates, the first relay member 114-1 moves in the x direction.

The second relay member 114-2 is a substantially rectangular frame-like member that includes two straight line units extending in the x direction and two straight line units extending in the y direction and that extends on the x-y plane. The third driving device 111-3 is provided inside the second relay member 114-2. The second relay member 114-2 is supported by the chassis, which is not illustrated, in such a way as to be able to move in the y direction and not move in the z and x directions.

The internal width of the second relay member 114-2 in the y direction is substantially the same as the width of the third driving device 111-3 in the y direction, and the third driving device 111-3 and the second relay member 114-2 move in the y direction as one united body. The internal width of the second relay member 114-2 in the x direction is greater than the width of the third driving device 111-3 in the x direction, and movement of the third driving device 111-3 in the x direction is not transmitted to the second relay member 114-2.

The second driving shaft 112-2 is a substantially round columnar member extending in the x direction and rotates about a central axis extending in the x direction. The second driving device 111-2 rotates the second driving shaft 112-2 and detects the rotation of the second driving shaft 112-2. An x2 end of the second driving shaft 112-2 is fixed to an x1 end of the second gear 113-2. The second gear 113-2 and the second driving shaft 112-2 rotate about a central axis extending in the x direction as one united body. A gear groove formed in a part of the second relay member 114-2 on the z2 side engages with the second gear 113-2. When the second relay member 114-2 moves in the y direction, the second gear 113-2 rotates. When the second gear 113-2 rotates, the second relay member 114-2 moves in the y direction.

That is, linear motion of the operation member 110 in the x direction and rotational motion of the first driving shaft 112-1 are converted into each other. Linear motion of the operation member 110 in the y direction and rotational motion of the second driving shaft 112-2 are converted into each other. Conversion of linear motion and rotational motion is not limited to the exemplary configuration described in the present embodiment.

Driving Devices

Figure 2:
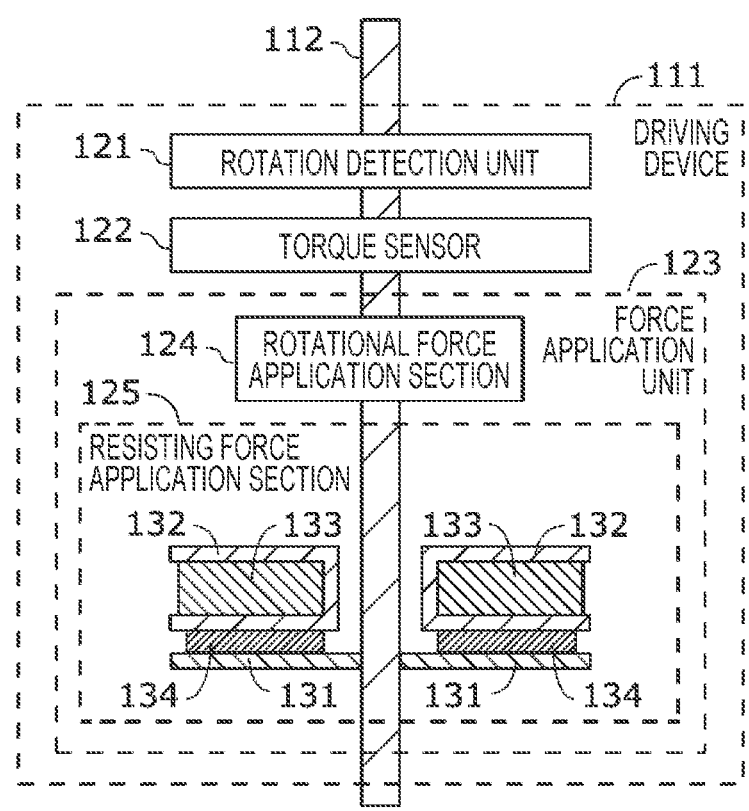
FIG. 2 is a diagram illustrating a schematic configuration of driving devices illustrated in FIG. 1.

FIG. 2 is a diagram illustrating a schematic configuration of the driving devices 111 illustrated in FIG. 1. The three driving devices 111 have the same configuration. The driving devices 111 each include a rotation detection unit 121, a torque sensor 122, and a force application unit 123. The rotation detector or rotation detection unit 121 is a rotary encoder, for example, and detects the rotational speed of the driving shafts 112. The torque sensor 122 is of a magnetostrictive type, for example, and detects torque applied to the driving shaft 112. The force application unit 123 includes a rotational force application section 124 and a resisting force application section 125 and applies various types of force to the driving shaft 112.

The rotational force application section or rotation force applicator 124 may be, for example, an electric motor. In an example, the rotational force application section 124 rotates the driving shaft 112 on which a permanent magnet is mounted by varying current flowing into a coil in accordance with an instruction from the outside.

The resisting force application section or resistance force applicator 125 includes a transmission member 131, a coil case 132, a magnetic field application portion 133, and a magnetorheological fluid 134. The transmission member 131 is a discal member extending around and from the driving shaft 112. The transmission member 131 is fixed to the driving shaft 112 and moves in accordance with movement of the operation member 110. That is, the movement of the transmission member 131 is transmitted to the operation member 110 (FIG. 1), and the movement of the operation member 110 (FIG. 1) is transmitted to the transmission member 131.

The coil case 132 is provided at a distance from the driving shafts 112 in such a way as to surround the driving shaft 112. The magnetic field application portion or magnetic field applicator 133 is a coil inside the coil case 132 that surrounds the driving shaft 112 like a donut. The magnetorheological fluid 134 is located between the coil case 132 and the transmission member 131 and in contact with both the coil case 132 and the transmission member 131.

As current supplied to the magnetic field application portion 133 from the outside varies, a magnetic field applied to the magnetorheological fluid 134 varies. As the size of a magnetic field penetrating the magnetorheological fluid 134 varies in the direction in which the driving shaft 112 extends, the cohesive strength of particles in the magnetorheological fluid 134 varies. As the cohesive strength varies, force (also called friction force) resisting relative movement between the transmission member 131 and the coil case 132 varies.

The operator feels the friction force caused in the resisting force application section 125 as force resisting rotation. That is, the resisting force application section 125 varies resisting force applied to the operation member 110 (FIG. 1) by varying resisting force between the magnetorheological fluid 134 and the transmission member 131.

Control Device

Figure 3:
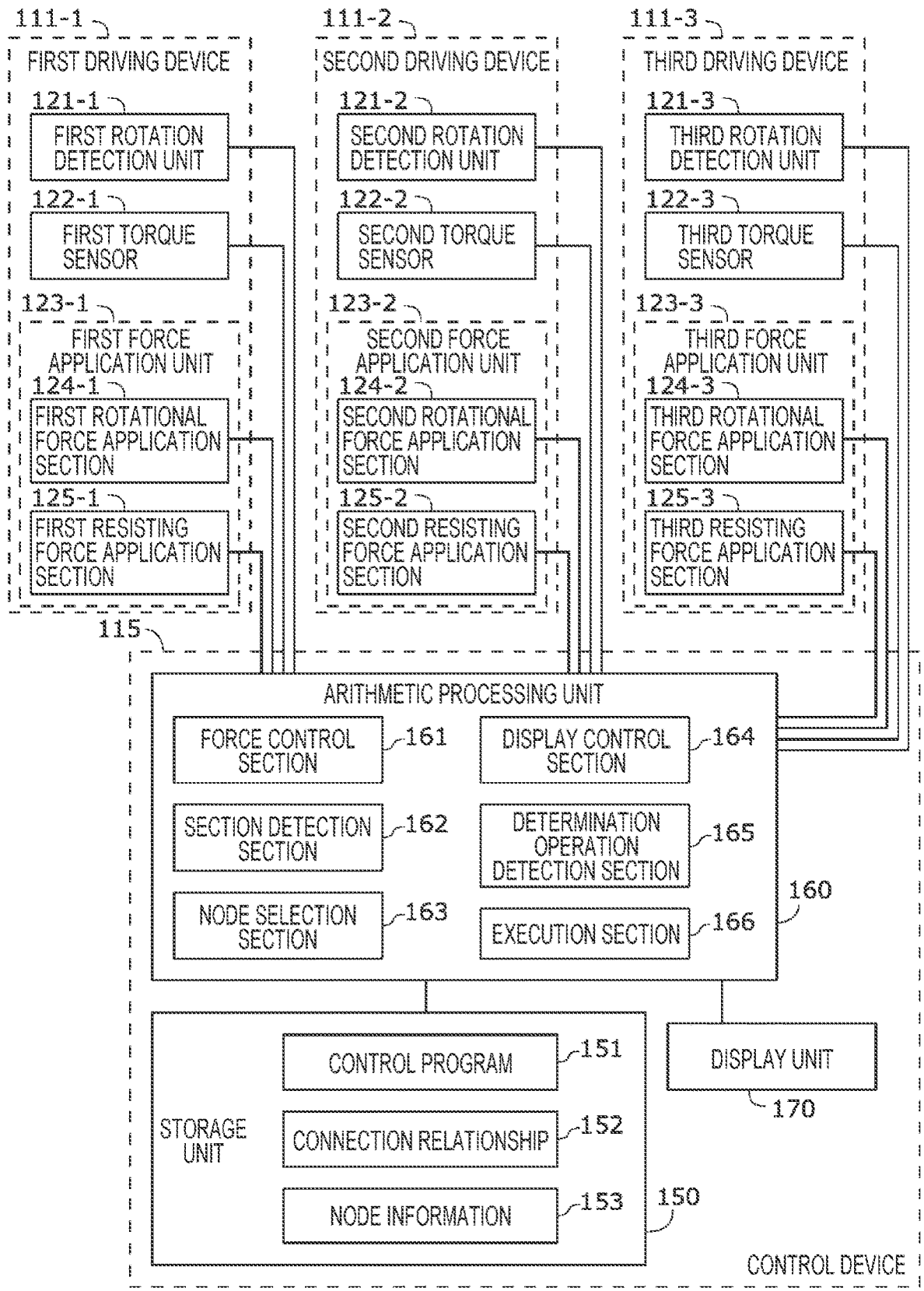
FIG. 3 is a block diagram illustrating the configuration of the three driving devices and a control device illustrated in FIG. 1.

FIG. 3 is a block diagram illustrating the configuration of the three driving devices 111 and the control device 115 illustrated in FIG. 1. Names of components of the first to third driving devices 111-1 to 111-3 are preceded by "first", "second", and "third" and followed by "-1", "-2", and "-3", respectively, for the purpose of distinction. The control device 115 includes a storage unit 150, an arithmetic processing unit 160, and a display unit 170.

Storage Unit

The memory or storage unit 150 stores a control program 151, a connection relationship 152, and node information 153. The control program 151 is read by the processor or arithmetic processing unit 160 and achieves a function of performing a part of a control method and other functions for the arithmetic processing unit 160. When the arithmetic processing unit 160 performs various functions, the storage unit 150 is controlled by the arithmetic processing unit 160 and stores necessary information as necessary. The storage unit 150 is a physical non-transitory storage medium. The storage unit 150 includes a read-only memory (ROM) and a random-access memory (RAM). The storage unit 150 is a volatile or nonvolatile storage medium. The storage unit 150 may be removable or non-removable.

Figure 4:
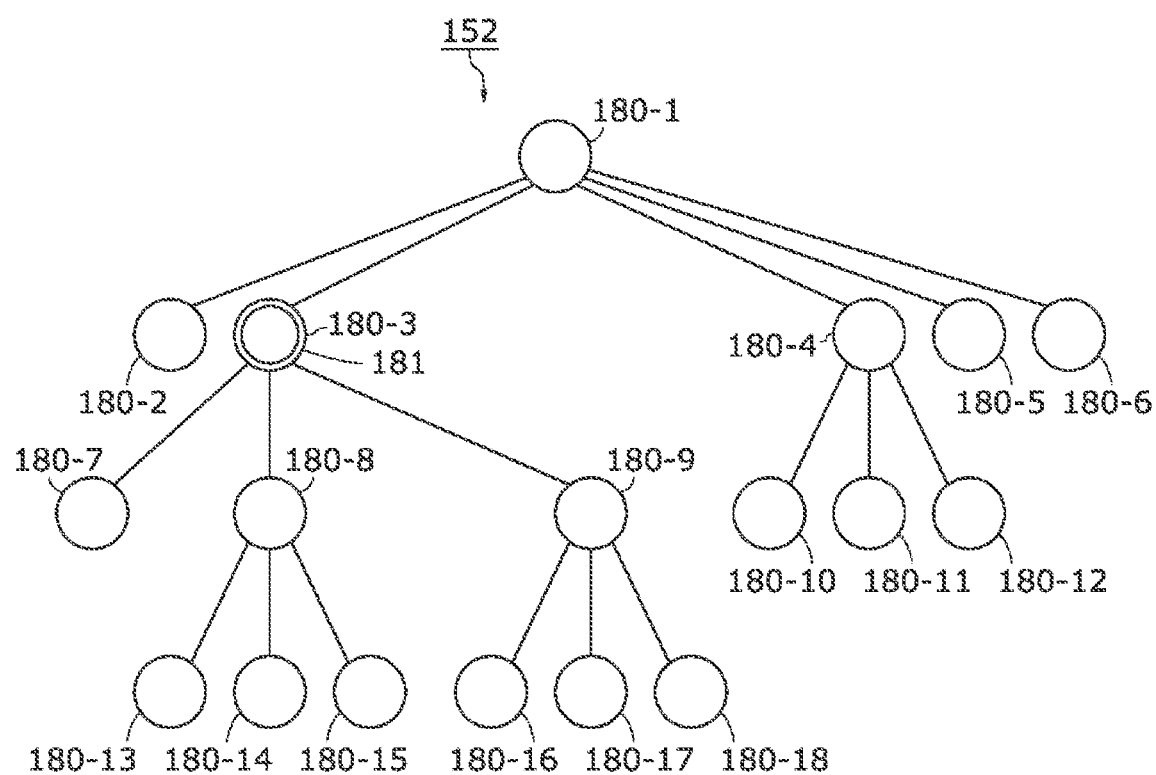
FIG. 4 is a diagram illustrating an exemplary connection relationship between nodes stored in a storage unit.

FIG. 4 is a diagram illustrating an exemplary connection relationship 152 between first to eighteenth nodes 180-1 to 180-18 (hereinafter might be generically referred to as nodes 180) stored in the storage unit 150. The number of nodes 180 included in the connection relationship 152 is not limited to 18. The relationship between the nodes 180 is not limited to that illustrated in FIG. 4. Representation of the connection is not limited to that illustrated in FIG. 4.

The nodes 180 include one or more nodes 180 connected to a higher node 180, one or more nodes 180 connected to one or more lower nodes, and one or more nodes 180 that are not connected to any of lower nodes 180.

More specifically, the second to sixth nodes 180-2 to 180-6 are connected to the highest first node 180-1. The seventh to ninth nodes 180-7 to 180-9 are connected to the higher third node 180-3. The tenth to twelfth nodes 180-10 to 180-12 are connected to the higher fourth node 180-4. The thirteenth to fifteenth nodes 180-13 to 180-15 are connected to the higher eighth node 180-8. The sixteenth to eighteenth nodes 180-16 to 180-18 are connected to the higher ninth node 180-9.

The node information 153 illustrated in FIG. 3 indicates information associated with the nodes 180 illustrated in FIG. 4. Information regarding the third node 180-3 illustrated in FIG. 4 is "activation of an audio system". Information regarding the eighth node 180-8 is "activation of a television". Information regarding the ninth node 180-9 is "activation of a radio". Information regarding the tenth node 180-10 is "activation of a radio". Information regarding the seventeenth node 180-17 is "switching of frequency of a radio".

In FIG. 4, the third node 180-3 is illustrated as an example of a selected node 181. The selected node 181 is selected from the nodes 180 and switched in accordance with a position of the operation member 110 (FIG. 1) as described later.

Arithmetic Processing Unit

The processor or arithmetic processing unit 160 illustrated in FIG. 3 reads and executes the control program 151 stored in the storage unit 150 to function as a force control section 161, a section detection section 162, a node selection section 163, a display control section 164, a determination operation detection section 165, and an execution section 166. The arithmetic processing unit 160 according to the present embodiment is a general-purpose computer but may be an application-specific integrated circuit (ASIC) or another type of circuit into which the functions described in the present embodiment can be incorporated.

The display unit 170 is a liquid crystal display, for example, and displays various images in accordance with instructions from the arithmetic processing unit 160.

Sections

Figure 5:
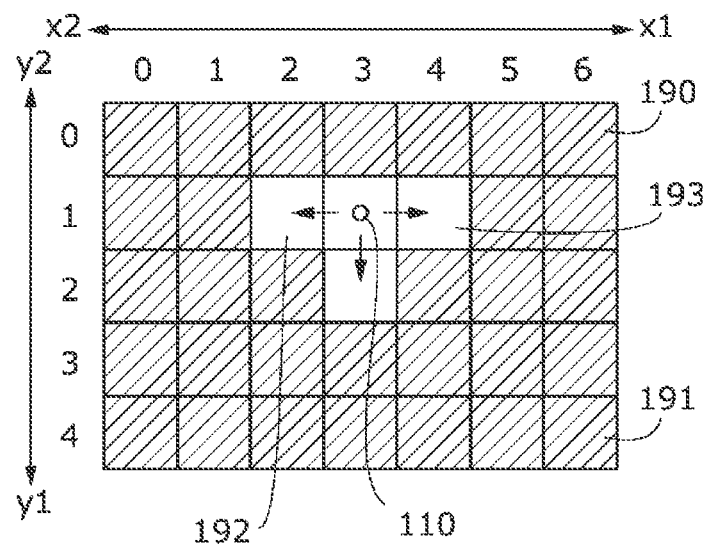
FIG. 5 is a diagram schematically illustrating a plurality of sections in an example.

FIG. 5 is a diagram schematically illustrating a plurality of sections 190 in an example. As illustrated in FIG. 5, the sections 190 are set as substantially square areas defined by two sides in an x direction and two sides in a y direction. All the sections 190 have the same shape. In another example, the sections 190 may have a different shape, instead. Seven sections 190 linearly arranged in the x direction form a row, and five rows are arranged in the y direction. In other words, five sections 190 linearly arranged in the y direction form a column, and seven columns are arranged in the x direction. There are a total of 35 sections 190.

Positions of the sections 190 are expressed as (x, y) using an x coordinate of 0 to 6 and a y coordinate of 0 to 4. In FIG. 5, an exemplary position of the operation member 110 at a certain time point is schematically indicated by a dot smaller than each section 190. The actual size of the operation member 110 may be larger than each section 190. Sections 190 sharing the same y coordinate belong to the same layer. Sections 190 having a smaller y coordinate are regarded as being in a higher layer than sections 190 having a larger y coordinate. Sections 190 having a larger y coordinate are regarded as being in a lower layer than sections 190 having a smaller y coordinate.

The operation member 110 is movably supported in the y1 direction (also referred to as a first forward direction), the y2 direction (also referred to as a first reverse direction), the x1 direction (also referred to as a second forward direction), and the x2 direction (also referred to as a second reverse direction). The first forward direction and the first reverse direction, which are opposite each other, are names for simply identifying directions. The second forward direction and the second reverse direction, which are opposite each other, are names for simply identifying directions. The first forward direction and the first reverse direction each intersect with both the second forward direction and the second reverse direction.

Restricted sections 191 hatched in FIG. 5 indicate a part of the sections 190 into which the operation member 110 cannot move. Although a reference numeral is provided for only one restricted section 191 in FIG. 5, all the hatched sections 190 will be referred to as restricted sections 191. Permitted sections 192 that are not hatched indicate a part of the sections 190 within which the operation member 110 can move. Although a reference numeral is provided for only one permitted section 192 in FIG. 5, all the sections 190 that are not hatched will be referred to as permitted sections 192. The restricted sections 191 and the permitted sections 192 are set in accordance with the position of the operation member 110. The operation member 110 located at coordinates (3, 1) in FIG. 5, for example, can move between the sections 190 in the x1, x2, and y1 directions, but cannot move between the sections in the y2 direction.

A determination target section 193 is assigned as, among the permitted sections 192, a section 190 in which a determination operation, which will be described later, is detected. The determination target section 193 is assigned in accordance with the second node 180-2, the fifth to seventh nodes 180-5 to 180-7, and the tenth to eighteenth nodes 180-10 to 180-18, which do not have a lower node 180 in FIG. 4.

Force Control Section

The force control section 161 illustrated in FIG. 3 controls force applied to the driving shafts 112 (FIG. 2) by the three force application unit 123 on the basis of outputs of the three rotation detection units 121 and the three torque sensors 122. When one of the driving shafts 112 (FIG. 2) rotates in a rotation direction as a result of an operation performed by the operator, the rotational force application section 124 applies force to the driving shaft 112 (FIG. 2) in the rotation direction, and the operator feels acceleration. When the rotational force application section 124 applies force to the driving shaft 112 (FIG. 2) in a direction opposite the rotation direction, the operator feels resisting force.

The force control section 161 adjusts resisting force applied to the driving shafts 112 (FIG. 2) by the resisting force application section 125. The resisting force application section 125, which employs the magnetorheological fluid 134, can apply a more distinct resisting force to the driving shafts 112 (FIG. 2) than the rotational force application section 124, which is an electric motor. The force control section 161 applies force to the driving shafts 112 (FIG. 2) while combining the rotational force application section 124 and the resisting force application section 125 together.

The force control section 161 applies force to the operation member 110 (FIG. 1) within each section 190 (FIG. 5) such that the operation member 110 is pulled toward the center of the section 190 (FIG. 5). That is, when the operation member 110 (FIG. 1) is going out of one of the sections 190 (FIG. 5), the force control section 161 applies resisting force in a direction opposite a moving direction of the operation member 110 (FIG. 1) using the force application unit 123. As the operation member 110 becomes farther from the center of the section 190 (FIG. 5) and closer to a boundary between the section 190 and another section 190 (FIG. 5), the resisting force increases. Force necessary to move the operation member 110 (FIG. 1) from one section 190 (FIG. 5) to another is small enough for a person to produce by his/her hand.

Outputs of a first rotation detection unit 121-1, a second rotation detection unit 121-2, a first torque sensor 122-1, and a second torque sensor 122-2 that vary in accordance with the movement of the operation member 110 (FIG. 1) on the x-y plane are mainly used to control force applied to the first driving shaft 112-1 (FIG. 1) and the second driving shaft 112-2 (FIG. 1). Outputs of a third rotation detection unit 121-3 and a third torque sensor 122-3 that vary in accordance with the rotation of the operation member 110 (FIG. 1) about a z axis are mainly used to control force applied to the third driving shaft 112-3 (FIG. 1). When the operator rotates the operation member 110 (FIG. 1), for example, resisting force is applied stepwise at a certain angle according to scale intervals of a dial.

Section Detection Section

The section detection section 162 illustrated in FIG. 3 detects a section 190 (FIG. 5) in which the operation member 110 is located on the basis of the outputs of the first rotation detection unit 121-1, the first torque sensor 122-1, the second rotation detection unit 121-2, and the second torque sensor 122-2.

Node Selection Section

As illustrated in FIG. 4, the node selection section 163 illustrated in FIG. 3 selects one of the nodes 180 as a selected node 181 in accordance with a detected section 190 (FIG. 5) in which the operation member 110 is located.

Referring to FIG. 4, the node selection section 163 (FIG. 3) selects, as the operation member 110 (FIG. 5) moves in the y1 direction, a node 180 connected to a higher selected node 181 before the movement as a selected node 181. If the third node 180-3 is a selected node 181 before movement, the node selection section 163 selects the eighth node 180-8 as a selected node 181 as the operation member 110 (FIG. 5) moves in the y1 direction.

The node selection section 163 (FIG. 3) selects, as the operation member 110 (FIG. 5) moves in the y2 direction, a node 180 connected to a lower selected node 181 before the movement as a selected node 181. If the ninth node 180-9 is a selected node 181 before movement, for example, the node selection section 163 selects the third node 180-3 as a selected node 181 as the operation member 110 (FIG. 5) moves in the y2 direction.

The node selection section 163 (FIG. 3) switches, in accordance with movement of the operation member 110 (FIG. 5) in the x1 or x2 direction, the selected node 181 between one or more nodes 180 connected to the same higher node 180. If the third node 180-3 is a selected node 181 before movement, for example, the selected node 181 is switched between the second to sixth nodes 180-2 to 180-6 in specified order in accordance with movement of the operation member 110 in the x1 or x2 direction.

If a plurality of nodes 180 are connected to a higher node 180, the operation member 110 can move to only one predetermined node 180 from the higher node 180 and to the higher node 180 from only the predetermined node 180. For example, the operation member 110 can move to the eleventh node 180-11 from the fourth node 180-4 in FIG. 4, but cannot directly move to the tenth or twelfth node 180-10 or 180-12 from the fourth node 180-4. That is, the connection between the nodes 180 is a conceptual connection and does not necessarily indicate movability.

Display Control Section

Figure 6:
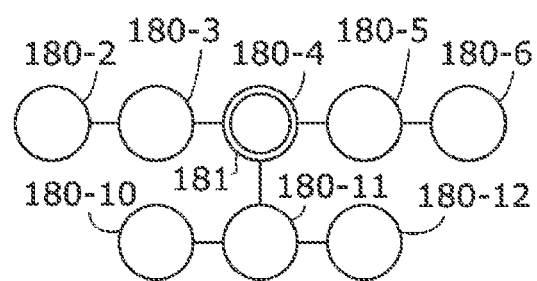
FIG. 6 illustrates an example of an image displayed when an operation member is located at a position illustrated in FIG. 5.

The display control section 164 illustrated in FIG. 3 generates an image to be displayed on the display unit 170 to control visible display. FIG. 6 illustrates an example of an image displayed on the display unit 170 when the operation member 110 is located at the position illustrated in FIG. 5.

As illustrated in FIG. 6, the second to fifth nodes 180-2 to 180-5 are constantly displayed. An image indicating all lower nodes 180 (the second to sixth nodes 180-2 to 180-6 in the example illustrated in FIG. 6) connected to a node 180 connected to a lower selected node 181 and lower nodes 180 (the tenth to twelfth nodes 180-10 to 180-12) connected to the selected node 181 is generated.

When a plurality of lower nodes 180 are connected to a higher node 180 in the connection relationship 152 illustrated in FIG. 4, the higher node 180 is connected to one of the lower nodes 180 in the image illustrated in FIG. 6. The lower nodes 180 are horizontally arranged in a line, and adjacent lower nodes 180 are connected to each other by lines. In the image, the selected node 181 is displayed differently from the other nodes 180. For example, the selected node 181 is represented by a double circle. In another example, the selected node 181 is highlighted by using a different color.

One of the sections 190 illustrated in FIG. 5 is assigned to each node 180 included in the image illustrated in FIG. 6. The assignment changes as the operation member 110 moves.

Determination Operation Detection Section

The determination operation detection section 165 illustrated in FIG. 3 detects the determination operation performed by the operation member 110 (FIG. 1). Referring to FIG. 5, the determination operation is movement of the operation member 110 in a determination direction, which is a direction parallel to the two-dimensional plane on which the sections 190 are arranged. The determination direction according to the present embodiment is the y1 direction. The determination direction is the same in all determination target sections 193, that is, the y1 direction.

The determination operation detection section 165 detects movement of the operation member 110, which is located in a determination target section 193 among the sections 190, in the determination direction (y1 direction) as a determination operation. Movement of the operation member 110 caused by pushing the operation member 110 in the y1 direction at coordinates (4, 1), for example, is detected as a determination operation. The determination direction remains the same in any section 190. A degree of pushing is set in advance. The operation member 110 need not go out of a section 190 or may move into another section 190.

Resisting force applied to the operation member 110 when the operation member 110 moves from a determination target section 193 in the determination direction is different from resisting force applied to the operation member 110 when the operation member 110 moves between sections 190 without a determination operation. Movement without a determination operation can be movement from a section 190 other than a determination target section 193 to another section 190 or movement from a determination target section 193 in a direction other than the determination direction. The resisting force applied to the operation member 110 when the operation member 110 moves from a determination target section 193 in the determination direction is larger than the resisting force applied to the operation member 110 when the operation member 110 moves between sections 190 without a determination operation.

When the operation member 110 moves from a section 190 adjacent to a restricted section 191 to the adjacent section 191, the force control section 161 (FIG. 3) applies, to the operation member 110, resisting force for preventing the operation member 110 from going out of the section 190 adjacent to the restricted section 191 using the force application unit 123 (FIG. 3). That is, when the operation member 110 is pushed toward a hatched restricted section 191 from a non-hatched permitted section 192, resisting force that is too large to be produced by a person's hand is applied to the operation member 110. When the operation member 110 is pushed toward a restricted section 191, distinct resisting force is generated using the resisting force application section 125 (FIG. 2), which employs the magnetorheological fluid 134 (FIG. 2), and applied to the operation member 110 so that the operator can feel a boundary of a section 190.

Execution Section

The execution section 166 illustrated in FIG. 3 performs a process corresponding to a section 190 in which the operation member 110 is located on the basis of the section 190 detected by the section detection section 162 and a determination operation detected by the determination operation detection section 165. The execution section 166 performs the process on the basis of information stored in the node information 153 and associated with a selected node 181. If a determination operation is performed at coordinates (5, 1) illustrated in FIG. 5, for example, the execution section 166 performs the process on the basis of information regarding the sixth node 180-6 illustrated in FIG. 6, which corresponds to the coordinates (5, 1). The information associated with the sixth node 180-6 is, for example, "activation of an air conditioner".

The execution section 166 illustrated in FIG. 3 detects rotation of the operation member 110 (FIG. 1) on the basis of the outputs of the third rotation detection unit 121-3 and the third torque sensor 122-3, for example, and changes the temperature of an air conditioner in accordance with rotational speed. In order to prevent an erroneous operation, the operation member 110 (FIG. 1) may be firmly fixed while the operation member 110 (FIG. 1) is moving along the x-y plane.

Example of Operation

FIG. 5 is a diagram illustrating restricted sections 191 (hatched) and permitted sections 192 (not hatched) at a time when the operation member 110 is located at the coordinates (3, 1). A determination target section 193 is at the coordinates (4, 1). FIG. 6 illustrates an image displayed on the display unit 170 when a selected node 181 is the fourth node 180-4. Lower nodes 180 connected to the fourth node 180-4, which is the selected node 181, are displayed.

As illustrated in FIG. 5, five sections 190 arranged in the x direction from coordinates (1, 1) to the coordinates (5, 1) correspond to the second to sixth nodes 180-2 to 180-6, respectively, illustrated in FIG. 6. As illustrated in FIG. 5, three sections 190 arranged in the x direction from coordinates (2, 2) to coordinates (4, 2) correspond to the tenth to twelfth nodes 180-10 to 180-12, respectively, illustrated in FIG. 6.

Figure 7:
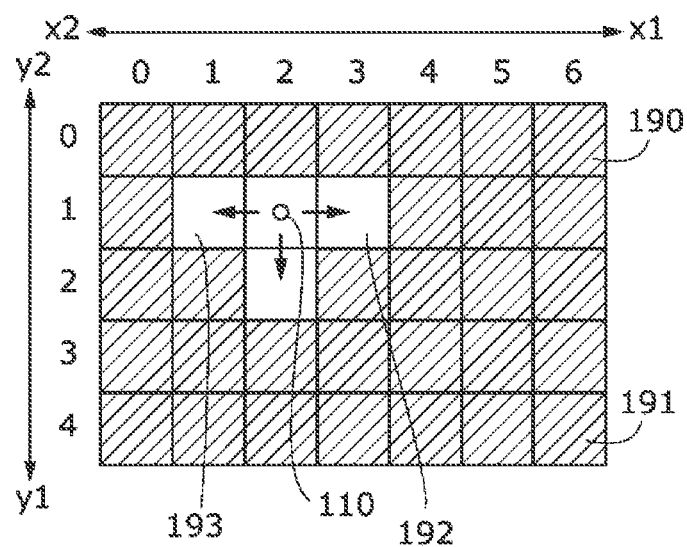
FIG. 7 is a diagram illustrating sections to which the operation member can move and sections to which the operation member cannot move after the operation member illustrated in FIG. 5 moves to coordinates (2, 1)
Figure 8:
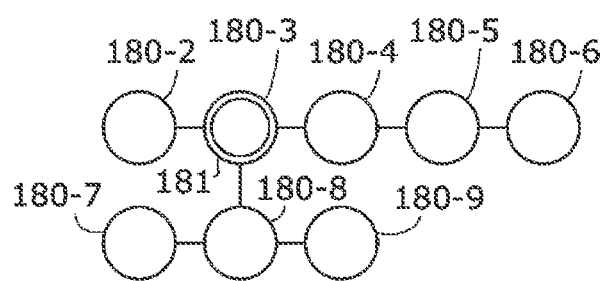
FIG. 8 illustrates an image displayed when a selected node is a third node.

FIG. 7 is a diagram illustrating restricted sections 191 (hatched) and permitted sections 192 (not hatched) after the operation member 110 illustrated in FIG. 5 moves to coordinates (2, 1). A determination target section 193 is at the coordinates (1, 1). FIG. 8 illustrates an image displayed on the display unit 170 when a selected node 181 is the third node 180-3. In the image illustrated in FIG. 8, the lower nodes 180 connected to the fourth node 180-4 illustrated in FIG. 6 are removed, and lower nodes 180 connected to the third node 180-3 are displayed.

Correspondences between sections 190 (FIG. 7) in a layer (a y1 layer in FIG. 7) to which the third node 180-3 belongs and the nodes 180 (FIG. 8) are the same as in FIGS. 5 and 6. Correspondences in a layer immediately below the coordinates (2, 1) are changed. As illustrated in FIG. 7, three sections 190 arranged in the x direction from coordinates (1, 2) to coordinates (3, 2) correspond to the seventh to ninth nodes 180-7 to 180-9, respectively, illustrated in FIG. 8.

Figure 9:
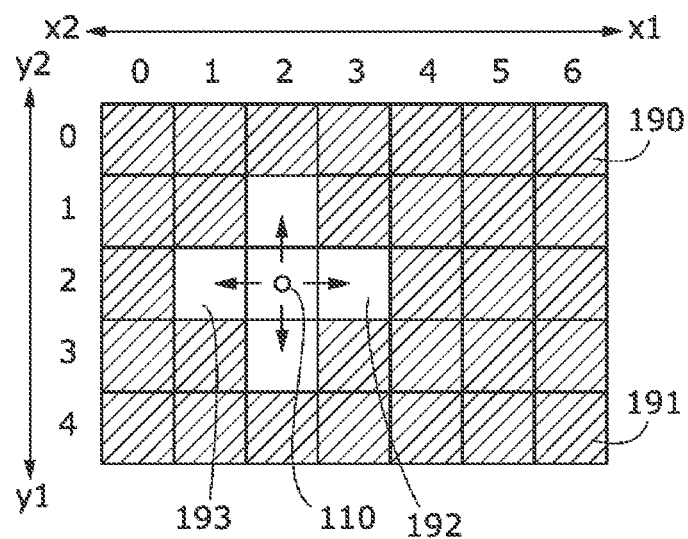
FIG. 9 is a diagram illustrating sections to which the operation member can move and sections to which the operation member cannot move after the operation member illustrated in FIG. 7 moves to coordinates (2, 2)
Figure 10:
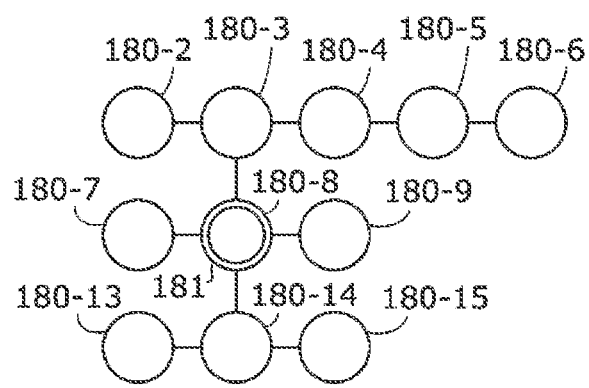
FIG. 10 illustrates an image displayed when the selected node is an eighth node.

FIG. 9 is a diagram illustrating restricted sections 191 (hatched) and permitted sections 192 (not hatched) after the operation member 110 illustrated in FIG. 7 moves to coordinates (2, 2). A determination target section 193 is at the coordinates (1, 2). FIG. 10 illustrates an image displayed on the display unit 170 when a selected node 181 is the eighth node 180-8. In the image illustrated in FIG. 10, lower nodes 180 connected to the eighth node 180-8 are displayed as well as the nodes 180 illustrated in FIG. 8.

Correspondences between sections 190 (FIG. 9) in a layer (a y1 layer in FIG. 9) to which the third node 180-3 belongs and a layer (a y2 layer in FIG. 9) to which the eighth node 180-8 belongs and the nodes 180 (FIG. 10) are the same as in FIGS. 7 and 8. Correspondences in a layer immediately below the coordinates (2, 2) are changed. As illustrated in FIG. 9, three sections 190 arranged in the x direction from coordinates (1, 3) to coordinates (3, 3) correspond to the thirteenth to fifteenth nodes 180-13 to 180-15, respectively, illustrated in FIG. 10.

Figure 11:
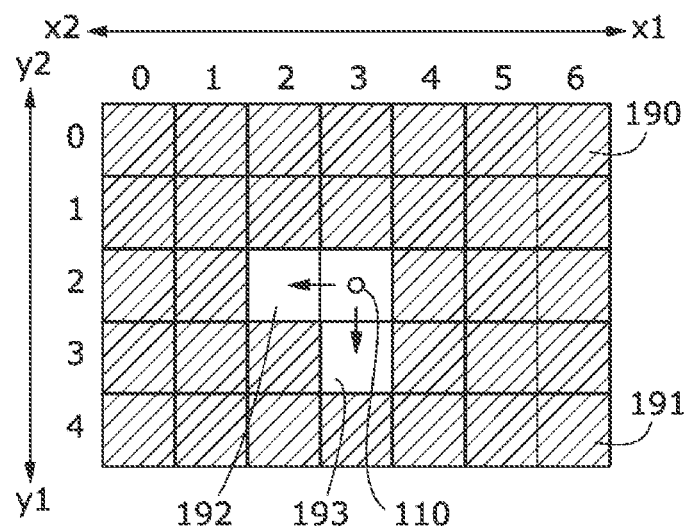
FIG. 11 is a diagram illustrating sections to which the operation member can move and sections to which the operation member cannot move after the operation member illustrated in FIG. 9 moves to coordinates (3, 2)
Figure 12:
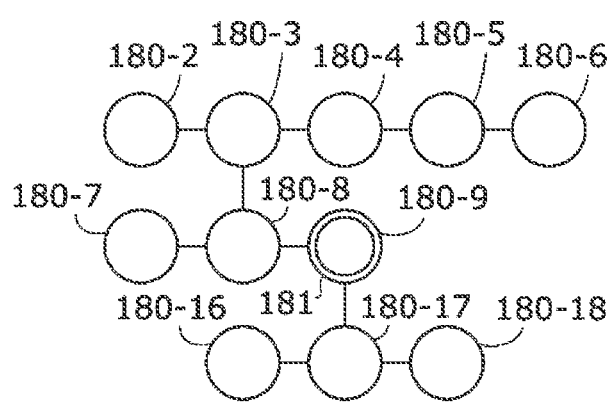
FIG. 12 illustrates an image displayed when the selected node is a ninth node.

FIG. 11 is a diagram illustrating restricted sections 191 (hatched) and permitted sections 192 (not hatched) after the operation member 110 illustrated in FIG. 9 moves to the coordinates (3, 2). A determination target section 193 is at the coordinates (3, 3). FIG. 12 illustrates an image displayed on the display unit 170 when a selected node 181 is the ninth node 180-9. In the image illustrated in FIG. 12, the lower nodes 180 connected to the eighth node 180-8 illustrated in FIG. 10 are removed, and lower nodes 180 connected to the ninth node 180-9 are displayed.

Correspondences between sections 190 (FIG. 11) in a layer (a y1 layer in FIG. 11) to which the third node 180-3 belongs and a layer (a y2 layer in FIG. 11) to which the ninth node 180-9 belongs and the nodes 180 (FIG. 12) are the same as in FIGS. 9 and 10. Correspondences in a layer immediately below the coordinates (3, 2) are changed. As illustrated in FIG. 11, three sections 190 arranged in the x direction from coordinates (2, 3) to coordinates (4, 3) correspond to the sixteenth to eighteenth nodes 180-16 to 180-18, respectively, illustrated in FIG. 12.

Figure 13:
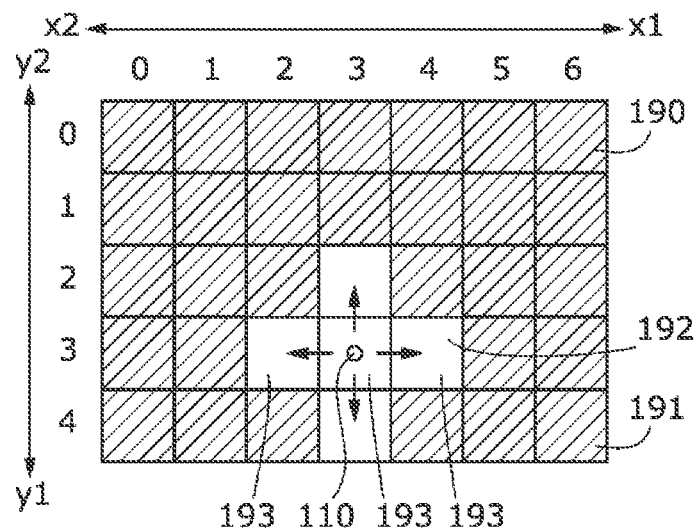
FIG. 13 is a diagram illustrating sections to which the operation member can move and sections to which the operation member cannot move after the operation member illustrated in FIG. 11 moves to coordinates (3, 3)
Figure 14:
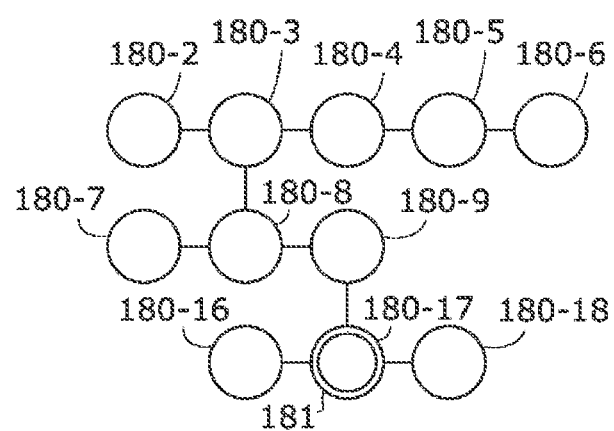
FIG. 14 illustrates an image displayed when the selected node is a seventeenth node.

FIG. 13 is a diagram illustrating restricted sections 191 (hatched) and permitted sections 192 (not hatched) after the operation member 110 illustrated in FIG. 11 moves to the coordinates (3, 3). Determination target sections 193 are at the coordinates (2, 3), (3, 3), and (4, 3). FIG. 14 illustrates an image displayed on the display unit 170 when a selected node 181 is the seventeenth node 180-17. Since no lower nodes 180 are connected to the seventeenth node 180-17, the nodes 180 illustrated in FIG. 14 are the same as those illustrated in FIG. 12. Correspondences between the sections 190 (FIG. 13) in all layers and the nodes 180 (FIG. 14) are the same as in FIGS. 11 and 12.

If a determination operation, that is, pushing of the operation member 110 in the y1 direction (e.g., a predetermined movement such as a slight movement within a section 190 or a movement between sections 190), is performed when the operation member 110 is located at the coordinates (3, 3) as illustrated in FIG. 13, the process is performed on the basis of information corresponding to the seventeenth node 180-17 illustrated in FIG. 14. A section 190 at coordinates (3, 4) adjacent to a section 190 at the coordinates (3, 3) in the determination direction may be determined as a restricted section 191.

Method for Controlling Input Apparatus

Figure 15:
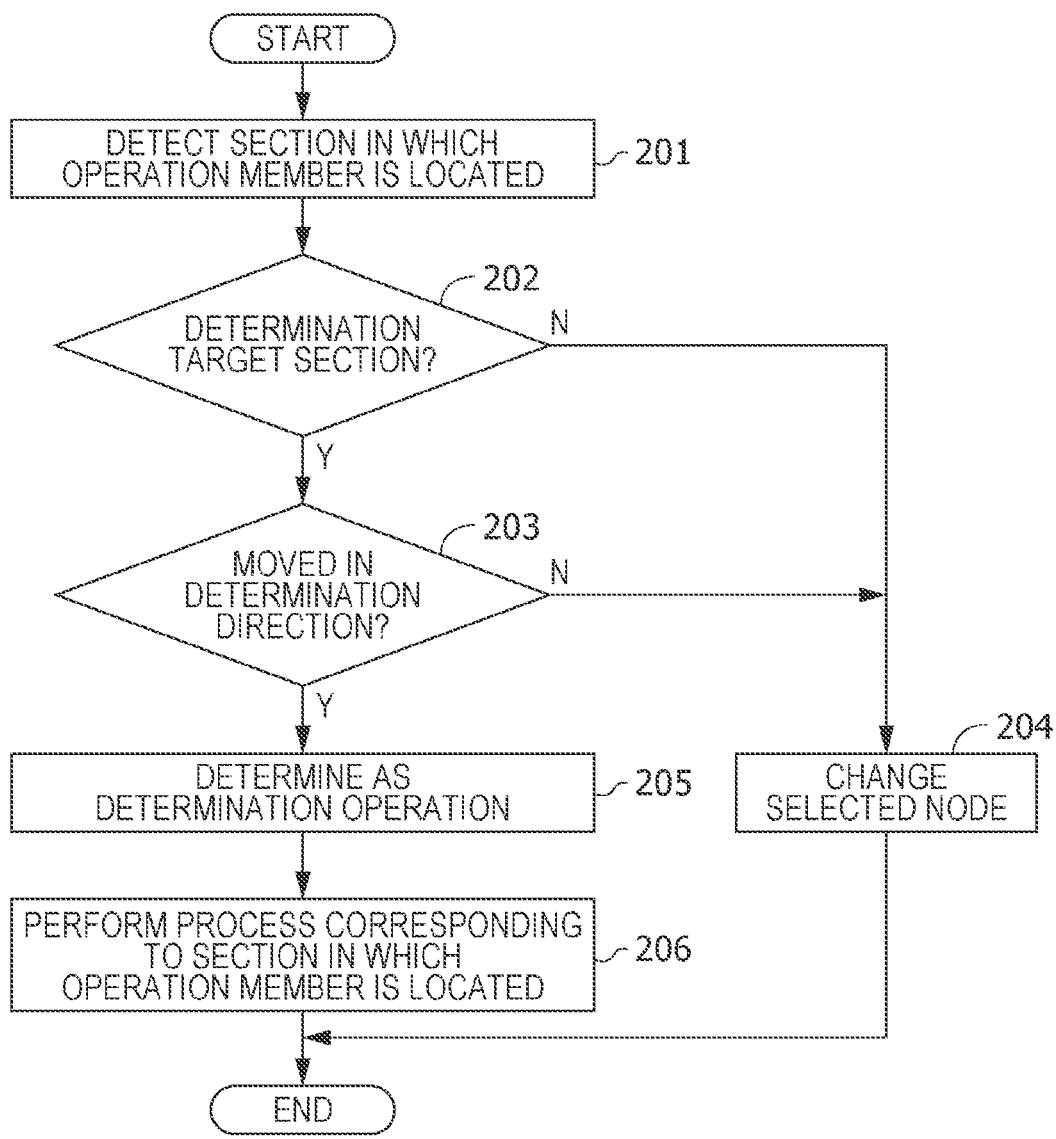
FIG. 15 is a flowchart illustrating a method for controlling the input apparatus performed by the input apparatus illustrated in FIG. 1.

FIG. 15 is a flowchart illustrating a method for controlling an input apparatus performed by the input apparatus 100 (FIG. 1) illustrated in FIG. 1. Although FIG. 13 is referred to as an example in FIG. 15, the position of the operation member 110 may be different, instead. First, in step 201 illustrated in FIG. 15, the section detection section 162 (FIG. 3) detects a section 190 (FIG. 13) in which the operation member 110 (FIG. 13) is located. In the example illustrated in FIG. 13, the operation member 110 is located in the section 190 at the coordinates (3, 3).

Next, in step 202 illustrated in FIG. 15, the determination operation detection section 165 (FIG. 3) determines whether the operation member 110 (FIG. 13) is located in a determination target section 193 (FIG. 13). In the example illustrated in FIG. 13, the operation member 110 is located in a determination target section 193. If it is determined in step 202 illustrated in FIG. 15 that the operation member 110 is located in a determination target section 193 (FIG. 13), the determination operation detection section 165 (FIG. 3) determines in step 203 whether the operation member 110 (FIG. 13) has moved from the determination target section 193 (FIG. 13) in the determination direction (i.e., the y1 direction).

If it is determined in step 202 that the operation member 110 (FIG. 13) is not located in a determination target section 193 (FIG. 13), or if it is determined in step 203 that the operation member 110 (FIG. 13) has not moved from the determination target section 193 (FIG. 13) in the determination direction, the node selection section 163 (FIG. 3) changes, in step 204, a selected node 181 (FIG. 13) in accordance with movement between sections 190 (FIG. 13). A method for changing the selected node 181 is as described with reference to FIGS. 5 to 14. After step 204, the method ends.

If it is determined in step 203 that the operation member 110 (FIG. 13) has moved from the determination target section 193 (FIG. 13) in the determination direction, the determination operation detection section 165 (FIG. 3) determines in step 205 that the determination operation has been performed. After step 205, the execution section 166 (FIG. 3) performs, in step 206, various processes on the basis of information stored in the node information 153 (FIG. 3) and associated with the selected node 181 (FIG. 14).

If the determination operation is performed at the coordinates (3, 3) illustrated in FIG. 13, for example, a process is performed on the basis of information associated with the seventeenth node 180-17 illustrated in FIG. 14. For example, "switching of frequency of a radio", which is associated with the seventeenth node 180-17, is performed. After step 206, the method ends. The method for controlling an input apparatus is repeatedly performed.

Overview

The present embodiment is the input apparatus 100 including the operation member 110 supported movably in accordance with the plurality of sections 190 set on the two-dimensional plane, the section detection section 162 configured to detect a section 190 in which the operation member 110 is located, the determination operation detection section 165 configured to detect the determination operation performed using the operation member 110, and the execution section 166 configured to perform a process corresponding to the section 190 in which the operation member 110 is located on the basis of the section 190 detected by the section detection section 162 and the determination operation detected by the determination operation detection section 165. The determination operation is movement of the operation member 110 in the determination direction (y1 direction), which is a direction parallel to the two-dimensional plane.

With this configuration, if a determination operation is performed separately from movement of the operation member 110 to a section 190, a process corresponding to the section 190 in which the operation member 110 is located is performed. Compared to when the determination operation is not necessary, therefore, an unintended process tends to be prevented. Since the determination operation is performed through an operation along the two-dimensional plane, structure and operation are simpler than when a switch is separately provided for the determination operation. In addition, structure and operation are simpler than when an operation other than movement along the two-dimensional plane is necessary.

More preferably, in the input apparatus 100 in the present disclosure, the plurality of sections 190 may include a plurality of determination target sections 193 assigned as sections for the determination operation. The determination direction may be the same in all the determination target sections 193.

With this configuration, since the determination direction is the same in all the determination target sections 193, operation is simpler than when the determination direction is different between the determination target sections 193, and an unintended operation can be easily prevented.

More preferably, the input apparatus 100 in the present disclosure may further include a force application unit 123 configured to apply force to the operation member. If the operation member 110 is going out of the section 190, the force application unit may apply, to the operation member 110, resisting force whose direction is opposite a direction in which the operation member is moving.

With this configuration, the operation member 110 can be distinctly moved to each section 190 compared to when resisting force is not applied, and an unintended operation can be easily prevented.

More preferably, in the input apparatus 100 in the present disclosure, magnitude of the resisting force applied to the operation member 110 when the operation member 110 moves in the determination direction may be different from magnitude of the resisting force applied to the operation member 110 when the operation member 110 moves between the plurality of sections 190.

With this configuration, since the magnitude of resisting force felt by the operator is different between the determination operation and the movement between the sections 190, an unintended operation tends to be prevented.

More preferably, in the input apparatus 100 in the present disclosure, the resisting force applied to the operation member 110 when the operation member 110 moves from one of the determination target sections 193 in the determination direction may be larger than the resisting force applied to the operation member 110 when the operation member 110 moves between the plurality of sections 190.

With this configuration, since force felt by the operator when the operator performs the determination operation is larger than force felt by the operator when the operator moves the operation member between the sections 190, the operator can be prevented from unintendedly performing the determination operation when he/she actually intends to move the operation member between the sections 190.

More preferably, in the input apparatus 100 in the present disclosure, the plurality of sections 190 may include a restricted section 191. When the operation member moves from the section 190 adjacent to the restricted section 191 to the restricted section 191, the force application unit 123 may apply, to the operation member 110, the resisting force for preventing the operation member 110 from going out of the section 190 adjacent to the restricted section 191.

With this configuration, since the resisting force prevents the operation member 110 from going out of a section 190 in a restricted direction, the operator can accurately move the operation member 110 along sections 190.

More preferably, the input apparatus 100 in the present disclosure may further include a transmission member 131 configured to move in accordance with the movement of the operation member 110. The force application unit 123 may include a resisting force application section 125. The resisting force application section 125 includes a magnetorheological fluid 134 in contact with the transmission member 131 and a magnetic field application portion 133 configured to apply a magnetic field to the magnetorheological fluid 134. The resisting force application section 125 may change the resisting force applied to the operation member 110 by changing the resisting force between the magnetorheological fluid 134 and the transmission member 131.

With this configuration, since the resisting force can be precisely changed electrically, the resisting force for preventing an unintended operation can be applied more accurately. Distinct resisting force can be applied compared to especially when resisting force is applied only through rotation of an electric motor. The operator can therefore distinctly feel borders between the sections 190.

More preferably, the input apparatus 100 in the present disclosure may further include a storage unit 150 storing a connection relationship 152 between a plurality of nodes 180 and information associated with each of the plurality of nodes 180 and a node selection section 163 configured to select one of the plurality of nodes 180 as a selected node 181 in accordance with a detected position of the operation member 110. The operation member 110 may be supported movably in a first forward direction (y1 direction), a first reverse direction (y2 direction), a second forward direction (x1 direction), and a second reverse direction (x2 direction). The first forward direction and the first reverse direction may be opposite each other. The second forward direction and the second reverse direction may be opposite each other. The first forward direction and the first reverse direction may each intersect with both the second forward direction and the second reverse direction. The plurality of nodes 180 may include the one or more nodes 180 connected to the higher node 180. The plurality of nodes 180 may include the one or more nodes 180 connected to the lower node 180 and the one or more nodes 180 not connected to any lower node 180. The node selection section 163 may select, in accordance with movement of the operation member 110 in the first forward direction, the lower node 180 connected to the selected node before the movement as the selected node 181. The node selection section 163 may select, in accordance with movement of the operation member 110 in the first reverse direction, the higher node 180 connected to the selected node 181 before the movement as the selected node 181. The node selection section 163 may switch, in accordance with movement of the operation member 110 in the second forward direction or the second reverse direction, the selected node 181 between the one or more nodes 180 connected to the same higher node 180. The first forward direction may be the determination direction. The execution section 166 may perform the process on a basis of the information associated with the selected node 181.

With this configuration, since a movement direction from a higher node 180 to a lower node 180 is the same as the determination direction, the operator can intuitively perform operations. As a result, an unintended operation can be easily prevented.

More preferably, the input apparatus 100 in the present disclosure may further include a display control section 164 configured to control visible display. The display control section 164 may generate an image indicating all the lower nodes 180 connected to the higher node 180 connected to the selected node 181 and the lower node 180 connected to the selected node 181. The display control section 164 may display the selected node 181 in the image differently from the other nodes 180.

With this configuration, since the operator can select a selected node 181 while checking an image indicating nodes 180 close to the selected node 181, an operation that is not intended by the operator can be easily prevented.

More preferably, the input apparatus 100 in the present disclosure may further include a driving shaft 112 configured to rotatably support the operation member 110 and a rotation detection unit 121 configured to detect a rotation state of the driving shaft 112.

With this configuration, since an input can be made through not only movement of the operation member 110 along the two-dimensional plane but also rotation of the operation member 110, various inputs can be made promptly.

The present invention is not limited to the above-described embodiment. That is, those skilled in the art may carry out modification, combination, sub-combination, and substitution in various ways for the components according to the above-described embodiment within the technical scope of the present invention or a scope equivalent thereto.

The present invention can be applied to an input apparatus that involves movement of an operation member and a determination operation.

What is claimed is:

1. An input apparatus comprising:
    an operation member supported movably in accordance with a plurality of sections set on a two-dimensional plane;
    a processor and memory having instructions to configure the processor to comprise:
        a section detection section configured to detect a section in which the operation member is located;
    a determination operation detection section configured to detect a determination operation performed using the operation member; and
    an execution section configured to perform a process corresponding to the section in which the operation member is located on a basis of the section detected by the section detection section and the determination operation detected by the determination operation detection section,
    wherein the determination operation determines movement of the operation member in a determination direction, which is a direction parallel to the two-dimensional plane;
    a force application unit configured to apply force to the operation member,
    wherein, if the operation member is going out of the section, the force application unit applies, to the operation member, resisting force whose direction is opposite a direction in which the operation member is moving, and
    wherein magnitude of the resisting force applied to the operation member when the operation member moves in the determination direction is different from magnitude of the resisting force applied to the operation member when the operation member moves between the plurality of sections.

2. The input apparatus according to claim 1,
    wherein the plurality of sections include a plurality of determination target sections assigned as sections for the determination operation, and
    wherein the determination direction is the same in all the determination target sections.

3. The input apparatus according to claim 1,
    wherein the plurality of sections include a plurality of determination target sections assigned as sections for the determination operation, and
    wherein the resisting force applied to the operation member when the operation member moves from one of the determination target sections in the determination direction is larger than the resisting force applied to the operation member when the operation member moves between the plurality of sections.

4. The input apparatus according to claim 1,
wherein the plurality of sections include a restricted section, and
wherein, when the operation member moves from a section adjacent to the restricted section to the restricted section, the force application unit applies, to the operation member, the resisting force for preventing the operation member from going out of the section adjacent to the restricted section.

5. An input apparatus comprising:
an operation member supported movably in accordance with a plurality of sections set on a two-dimensional plane;
a processor and memory having instructions to configure the processor to comprise:
  a section detection section configured to detect a section in which the operation member is located;
  a determination operation detection section configured to detect a determination operation performed using the operation member; and
  an execution section configured to perform a process corresponding to the section in which the operation member is located on a basis of the section detected by the section detection section and the determination operation detected by the determination operation detection section,
wherein the determination operation determines movement of the operation member in a determination direction, which is a direction parallel to the two-dimensional plane;
a force application unit configured to apply force to the operation member,
wherein, if the operation member is going out of the section, the force application unit applies, to the operation member, resisting force whose direction is opposite a direction in which the operation member is moving;
a transmission member configured to move in accordance with the movement of the operation member,
wherein the force application unit includes a resisting force application section,
wherein the resisting force application section includes
a magnetorheological fluid in contact with the transmission member, and
a magnetic field application portion configured to apply a magnetic field to the magnetorheological fluid, and
wherein the resisting force application section changes the resisting force applied to the operation member by changing the resisting force between the magnetorheological fluid and the transmission member.

6. The input apparatus according to claim 2, further comprising:
a storage unit storing a connection relationship between a plurality of nodes and information associated with each of the plurality of nodes; and
a node selection section configured to select one of the plurality of nodes as a selected node in accordance with a detected position of the operation member,
wherein the operation member is supported movably in a first forward direction, a first reverse direction, a second forward direction, and a second reverse direction,
wherein the first forward direction and the first reverse direction are opposite each other,
wherein the second forward direction and the second reverse direction are opposite each other,
wherein the first forward direction and the first reverse direction each intersect with both the second forward direction and the second reverse direction,
wherein the plurality of nodes include one or more nodes connected to the higher node,
wherein the plurality of nodes include one or more nodes connected to lower node and one or more nodes not connected to any of lower nodes,
wherein the node selection section selects, in accordance with movement of the operation member in the first forward direction, a lower node connected to the selected node before the movement as the selected node,
wherein the node selection section selects, in accordance with movement of the operation member in the first reverse direction, a higher node connected to the selected node before the movement as the selected node,
wherein the node selection section switches, in accordance with movement of the operation member in the second forward direction or the second reverse direction, the selected node between one or more nodes connected to a same higher node,
wherein the first forward direction is the determination direction, and
wherein the execution section performs the process on a basis of the information associated with the selected node.

7. The input apparatus according to claim 6, further comprising:
a display control section configured to control visible display,
wherein the display control section generates an image indicating all lower nodes connected to a node connected to the lower selected node and a lower node connected to the selected node, and
wherein the display control section displays the selected node in the image differently from other nodes.

8. The input apparatus according to claim 1, further comprising:
a driving shaft configured to rotatably support the operation member; and
a rotation detection unit configured to detect a rotation state of the driving shaft.

9. A method for controlling an input apparatus performed by the input apparatus, which includes an operation member supported movably in accordance with a plurality of sections set on a two-dimensional plane, the method comprising:
detecting a section in which the operation member is located;
detecting a determination operation performed using the operation member; and
performing a process corresponding to the section in which the operation member is located on a basis of the detected section and the detected determination operation,
wherein the determination operation is movement of the operation member in a determination direction, which is a direction parallel to the two-dimensional plane,
wherein the plurality of sections include a plurality of determination target sections assigned as sections for the determination operation, and wherein the determination direction is the same in all the determination target sections.

\* \* \* \* \*